(12) United States Patent
Kuttner

(10) Patent No.: US 10,122,477 B2
(45) Date of Patent: Nov. 6, 2018

(54) TRANSMITTER PERFORMANCE CALIBRATION SYSTEMS AND METHODS

(71) Applicant: INTEL IP CORPORATION, Santa Clara, CA (US)

(72) Inventor: Franz Kuttner, St. Ulrich (AT)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/276,009

(22) Filed: Sep. 26, 2016

(65) Prior Publication Data
US 2018/0091241 A1   Mar. 29, 2018

(51) Int. Cl.
*H03C 1/62*       (2006.01)
*H04B 17/14*      (2015.01)
*H04L 27/152*     (2006.01)
*H04B 1/525*      (2015.01)
*H04B 1/04*       (2006.01)

(52) U.S. Cl.
CPC ............. *H04B 17/14* (2015.01); *H04B 1/525* (2013.01); *H04L 27/152* (2013.01); *H04B 2001/0408* (2013.01)

(58) Field of Classification Search
USPC .................................................. 455/91–129
See application file for complete search history.

(56) References Cited

U.S. PATENT DOCUMENTS

| 6,721,544 | B1 | 4/2004 | Franca-Neto | |
|---|---|---|---|---|
| 7,446,629 | B2 | 11/2008 | Nakamura et al. | |
| 8,947,282 | B1* | 2/2015 | Fuks | H03M 1/68 341/153 |
| 2010/0279617 | A1* | 11/2010 | Osman | H04B 17/104 455/63.1 |
| 2011/0116403 | A1* | 5/2011 | Kahrizi | H04B 1/0475 370/252 |
| 2011/0300914 | A1* | 12/2011 | Gudem | H04B 1/1027 455/574 |
| 2012/0057655 | A1 | 3/2012 | Marsili | |
| 2012/0219088 | A1* | 8/2012 | Friedrich | H04B 1/0475 375/296 |

(Continued)

FOREIGN PATENT DOCUMENTS

WO    20160073932 A1    5/2016

OTHER PUBLICATIONS

International Search Report and Written Opinion dated Nov. 13, 2017 in connection with International Patent Application No. PCT/US2017/046887.

*Primary Examiner* — Lana N Le

(74) *Attorney, Agent, or Firm* — Eschweiler & Potashnik, LLC

(57) ABSTRACT

An apparatus is disclosed that includes a transmit chain, a duplexer, a receive chain and a control circuit. The transmit chain is configured to generate a transmit signal at a transmit frequency. The duplexer is configured to pass the transmit signal to an antenna that generates a transmit leakage current into a received signal. The receive chain is configured to obtain the received signal and measure the leakage current from the transmit chain. The control circuit is configured to determine reduced performance parameters for the transmit chain based on the determined leakage signal, wherein the transmit leakage signal is inversely proportional to the reduced performance parameters.

13 Claims, 5 Drawing Sheets

(56) References Cited

U.S. PATENT DOCUMENTS

| | | | | |
|---|---|---|---|---|
| 2012/0276859 A1* | 11/2012 | Callender | ............ | H04B 1/1036 |
| | | | | 455/77 |
| 2013/0044791 A1* | 2/2013 | Rimini | ................... | H04B 1/109 |
| | | | | 375/219 |
| 2013/0155911 A1* | 6/2013 | Kahrizi | ................. | H04B 1/525 |
| | | | | 370/277 |
| 2014/0171001 A1* | 6/2014 | Fernando | ............... | H04B 17/21 |
| | | | | 455/226.1 |
| 2017/0222687 A1* | 8/2017 | Wyville | ................ | H04B 1/525 |

\* cited by examiner

TRANSMITTER PERFORMANCE CALIBRATION SYSTEMS AND METHODS

BACKGROUND

Wireless communications devices participate in wireless communications using a radio receiver and a radio transmitter. The receiver is coupled to an antenna and includes one or more components including a low noise amplifier, intermediate frequency stages, one or more filters, data recovery stages and the like. The low noise amplifier receives an inbound signal from the antenna and amplifies the received signal. The intermediate frequency stages mix the amplified received signal into baseband signals and/or intermediate frequency (IF) signals. The filters filter or remove unwanted portions of the baseband signals or IF signals. The filters attenuate unwanted out of band signals to produce filtered signals. The data recover stage recovers data from the filtered signals and can use, for example, in accordance with a wireless communication standard.

The transmitter is coupled to the same antenna and includes one or more components including a data modulation stage, one or more intermediate frequency stages, and a power amplifier. The data modulation stage converts data into baseband signals, for example in accordance with a wireless communication standard. The one or more intermediate frequency stages mix the baseband signals with one or more local oscillations to produce RF signals. The power amplifier amplifies the RF signals prior to transmission via the same antenna.

The receiver and the transmitter use the same antenna or antennas for cost savings, reduced complexity and the like. However, by using the same antenna, unwanted noise and/or interference from the transmitter can occur with the receiver and received signals. The noise and interference can substantially degrade communications with other devices.

DETAILED DESCRIPTION

Figure 1:
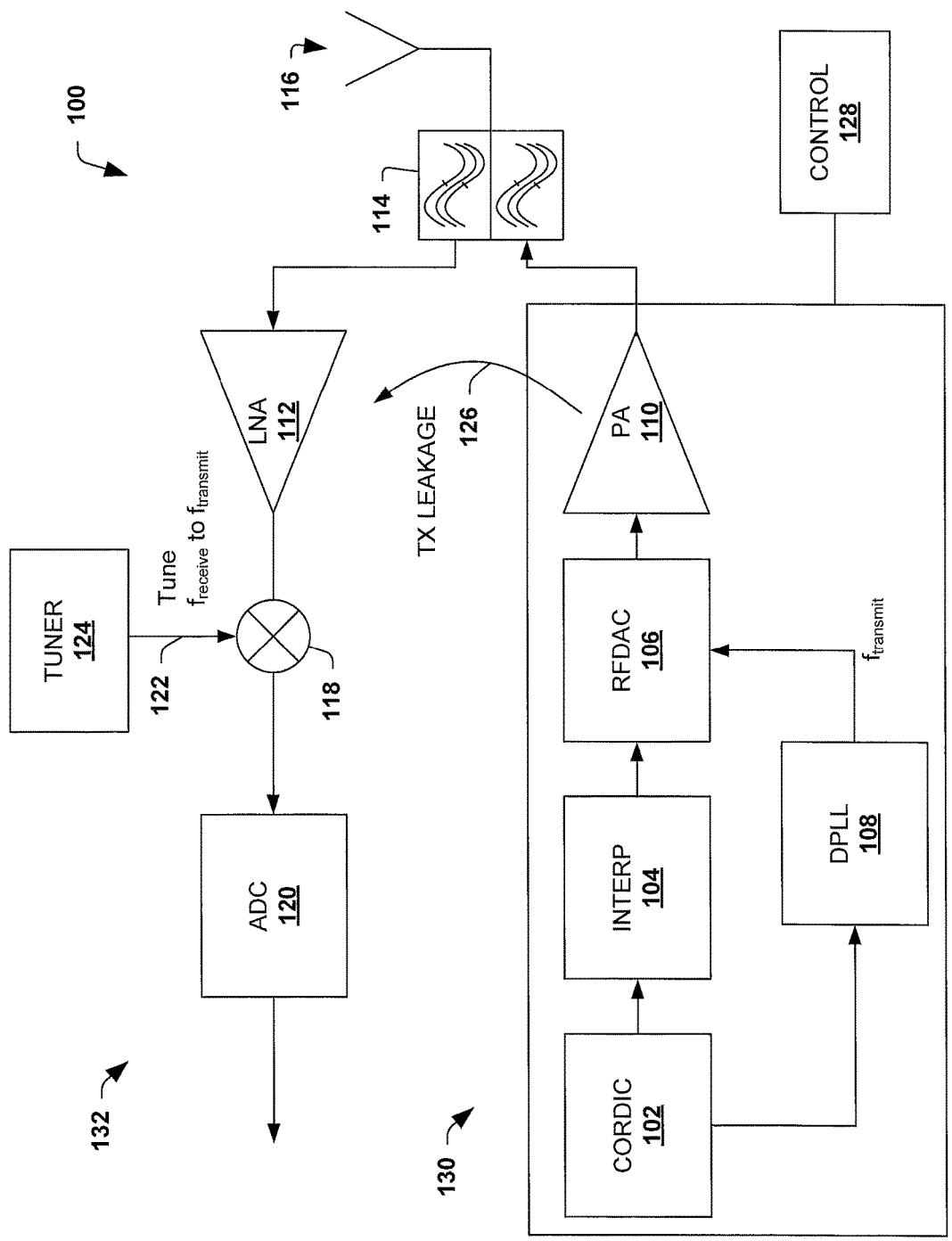
FIG. 1 is a diagram illustrating a mobile communications device in accordance with an embodiment.

The systems and methods of this disclosure are described with reference to the attached drawing figures, wherein like reference numerals are used to refer to like elements throughout, and wherein the illustrated structures and devices are not necessarily drawn to scale.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC, an electronic circuit and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Wireless communications involve transmission or transfer of data between devices using radio frequency (RF)

receivers (RX) and transmitters (TX). Each device typically includes a receiver and a transmitter, used to communicate with other devices. Generally, there are a variety of specifications involved with regards to power levels, modulations, frequencies used and the like. These specifications are often included as part of a communications standard.

The specifications can include a duplex distance, which is a space or distance between uplink and downlink frequencies. The uplink frequency for a device is communications using its transmitter and the downlink frequency is for communications using its receiver. In one example, a duplex distance for the Global System for Mobile communications (GSM) is 80 Mega Hertz (MHz), where the uplink channel and the downlink channel have frequencies that are 80 MHz apart. Other specifications include far off noise limits, generated quantization and the like.

An RF transmitter has to be designed in order to meet the specifications. Typically, this includes configuring an RF digital to analog converter (DAC) to use a relatively high number of bits, such as 14, to meet the specifications at the duplex distance.

Additionally, a wireless device can use a single or same antenna for transmitting and receiving. In order to do so, a duplexer is used to route TX signals out to the antenna from a TX chain and to route RX signals from the antenna to a RX chain. The duplexer has a plurality of ports configured to filter and/or route the signals. The duplexer, also referred to as a duplex filter, is configured to mitigate leakage of the TX signal to the RX chain.

The modulated TX signal generally leaks into the RX chain through the duplex filter. The TX chain is configured to overcome and/or account for the TX signal leakage into the RX chain. This includes configuring the DAC and other components of the chain to compensate and/or account for an expected or allowed TX signal leakage.

However, the duplexer can be configured to have an actual TX signal leakage less or substantially less than the allowed TX signal leakage. As a result, the configuration of the TX chain can be relaxed and still meet the standard or specifications.

FIG. 1 is a diagram illustrating a mobile communications arrangement or device 100 in accordance with an embodiment. The device 100 is provided in a somewhat simplified format in order to facilitate understanding. It is appreciated that suitable variations are contemplated. The device 100 can be implemented in circuitry and/or other suitable components.

The device 100 is configured to relax or lower performance parameters for transmission while maintaining leakage within a threshold amount.

The device 100 includes a transmit (TX) chain 130, a receive (RX) chain 132, a duplexer 114 and one or more antennas 116. The RX chain 132 and the TX chain 130 use the same antenna, the one or antenna 116, to TX signals and to RX signals. The duplexer 114 includes a plurality of ports and filtering components configured to pass RX signals to the RX chain 132 from the antenna 116 and to pass TX signals from the TX chain 130 to the antenna 116. Typically, some TX leakage 126 from the TX chain 130 enters the RX chain 132 via the duplexer.

The TX chain 130 includes a Co-Ordinate Rotation Digital Computer (CORDIC) core 102, an interpolator 104, an RFDAC 106, a digital phase locked loop (DPLL) and a power amplifier (PA) 110. It is contemplated that varied components and/or additional components can be utilized with the TX chain 130.

The CORDIC 102 generates/extracts phase and magnitude information from quadrature components (I and Q) of a data stream. The phase and magnitude information or stream from the CORDIC 102 is processed by the interpolator 104 to generate an interpolator output signal.

The RFDAC 106 is configured to generate an analog RF signal from the interpolator signal based on a DPLL signal. The DPLL signal is at a transmit frequency. The RF signal is modulated using the DPLL signal.

The DPLL 108 is configured to generate the DPLL signal at the transmit frequency based on a signal from the CORDIC 102. The PA 110 amplifies the analog RF signal. The duplexer 114 passes the analog RF signal to the one or more antenna 116 for transmission. Some amount of the analog RF signal leaks to the RX chain as TX leakage 126.

The amount of the TX leakage 126 is dependent upon factors including filtering by the duplexer 114. The TX leakage 126 can be less than an allowed TX signal leakage. In one example, the duplexer 114 is 4 dB to 5 dB better than a specification. As a result, the TX leakage 126 is substantially less the specified or allowed TX signal leakage.

The RX chain 132 includes a low noise amplifier (LNA) 112, a mixer 118, an analog to digital component (ADC) 120 and a tuner 124. The RX chain 132 receives a RX signal from the one or more antenna 116 via the duplexer 114. As described above, the RX signal includes TX leakage 126.

The LNA 112 amplifies the RX signal. The mixer 118 mixes or filters the amplified RX signal into a baseband signal based on a tuning signal 122. The tuning signal 122 is a local oscillator (LO) signal. The baseband signal is converted from analog to digital by the ADC 120.

The tuner 124 is configured to generate the tuning signal 122. The tuner 124 can configured to adjust the tuning signal based on the TX leakage signal 126 to measure the TX leakage. Additionally, the tuner 124 can be configured to adjust the tuning signal based on a RX frequency.

A control circuit 128 is configured to adjust performance parameters for the TX chain 130 to reduced performance parameters that still provide suitable performance. For example, a requirement or standard specification may allow leakage of 6 dB by the duplexer 114. The performance of the duplexer 114, in this example, only allows a leakage of 3 dB. Thus, the performance parameters for the TX chain 130 can be reduced from initial values, such as by using less bits, less power, and the like, and still result in a leakage of 6 dB or less. After reducing the performance parameters of the TX chain 130 in this example, the TX leakage has increased to 5 dB.

The control circuit 128 is configured to measure the performance of the duplexer 114 and adjust performance parameters for the TX chain 130 based on the measured performance. The control circuit 128 is coupled to the TX chain 130 and the tuner 124, however the connection to the tuner 124 is not shown to simplify the illustration.

One suitable technique to measure the performance of the duplexer 114 is for the control circuit 128 to cause the tuner 124 to adjust the tuning signal from a receive frequency to the TX frequency. The mixer 118 mixes the amplified signal using the TX frequency. As a result, the TX leakage 126 is substantially present in the baseband signal provided by the mixer 118.

The control circuit 128 measures the TX leakage 126 by, for example, comparing the TX leakage with allowed or threshold values. If the TX leakage 126 is below or substantially below the threshold value, performance of the TX chain 130 can be reduced. Other suitable techniques of measuring the TX leakage 126 and/or duplexer performance are contemplated. In one example, the variation from the threshold is specified in dB.

The control circuit 128 adjusts performance of the TX chain 130 according to the measured TX leakage. Performance parameters for one or more TX components including, but not limited to, the CORDIC 102, the interpolator 104, the RFDAC 106 and the PA 110 are determined by the control circuit 128. The one or more TX components are adjusted according to the determined performance parameters.

In one example, the control circuit 128 tests the determined parameters by again measuring the TX leakage 126 using the determined performance parameters. If the measured TX leakage is within acceptable values and/or below the threshold, the determined performance parameters are utilized. Otherwise, the parameters can be re-determined and tested. The process of determining the reduced performance parameters is referred to as a calibration operation or process.

For normal operation, the determined reduced parameters for the TX chain 130 that reduce performance are utilized. The normal operation includes generating and sending a transmit signal using a transmit frequency via the TX chain 130, the duplexer 114 and the one or more antenna 116 and receiving a signal using a receive frequency via the one or more antenna 116, the duplexer 114 and the RX chain 132.

The reduced performance parameters maintain the TX leakage 126 within allowable amounts while mitigating power consumption.

The performance parameters can include adjusting or reducing the resolution of the interpolator 104. Generally, the resolution is decreased by using less bits and increased by using more bits. For example, 1 bit of resolution for an interpolator can correspond to altering a quantization noise floor by 6 dB. So, measured TX leakage of more than 6 dB below the threshold can allow reducing the resolution of the interpolator 104 by 1 bit. It is appreciated that the 6 dB is under ideal circumstances for a perfect linear system. Implementations can achieve, for example, a noise reduction of only 1 to 2 dB per bit for interpolators. Thus, the measured TX leakage of more than 6 dB below the leakage threshold permits a bit reduction of 3 to 6 bits.

The performance parameters can also include adjusting or reducing the resolution of the RFDAC 106. One or more bits of the RFDAC 106 can be turned OFF or not used. In one example, one or more of the most significant bits (MSBs) are turned OFF. If a most significant bit is turned off, half of an array used with the RFDAC 106 is switched OFF. One or more other bits, include least significant bits (LSBs) can also be turned OFF.

The performance parameters can include adjusting or reducing the resolution of the DPLL 108. Reducing the resolution involves reducing the number of bits used for phase generation, which reduces power consumption by the DPLL 108 and the TX chain 130.

The performance parameters can include other suitable parameters that reduce performance.

It is appreciated that the device 100 can omit shown components and/or add additional components such as a phase component, a digital signal processor (DSP), a digital to time converter (DTC) and the like.

Figure 2:
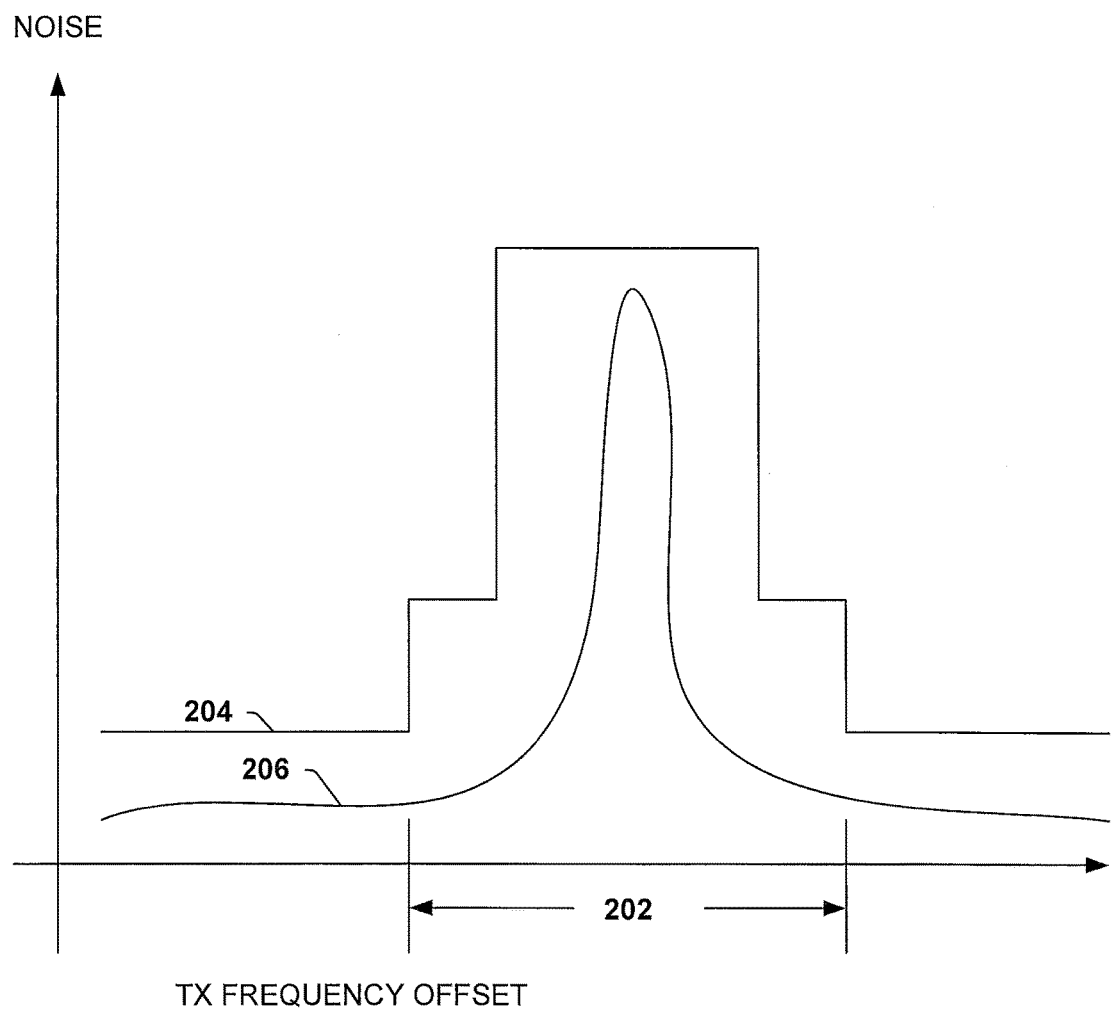
FIG. 2 is a graph depicting example transmission (TX) noise in a receiver chain.

FIG. 2 is a graph depicting example transmission (TX) noise in a receiver chain. The graph is provided for illustrative purposes and it is appreciated that other values can be present in a mobile communications device or circuitry.

The graph depicts noise along a y-axis and transmit frequency offset along an x-axis. Line 206 depicts TX leakage into the receiver chain where the receiver chain is tuned to a transmit frequency. Line 204 is a mask or noise mask. The mask 204 indicates allowed amounts of TX leakage that can be suitable filtered or removed from the RX chain. The example graph is provided using a TX frequency of 1872 MHz, a TX channel power of 2.1 dBm and an RX bandwidth of 100 kHz.

As described above, the TX leakage occurs at the duplexer. An example of this is provided above with regard to FIG. 1. The TX leakage is shown centered about a TX frequency. The performance parameters of the TX chain can be reduced as long as the TX leakage is within or below the allowed threshold, shown as the mask 204.

Figure 3:
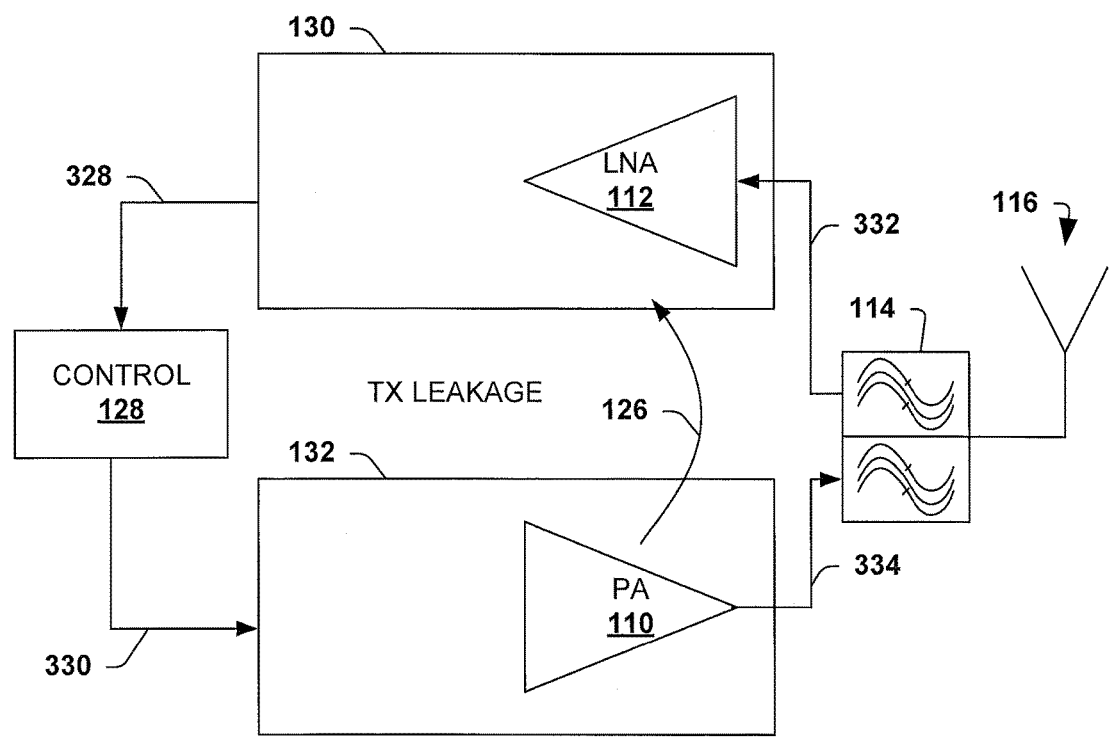
FIG. 3 is a diagram illustrating a portion of mobile communications device in accordance with an embodiment.

FIG. 3 is a diagram illustrating a portion of mobile communications device 300 in accordance with an embodiment. The device 300 is described performing a calibration process where reduced performance parameters are determined. The device 300 is provided in a somewhat simplified format in order to facilitate understanding. It is appreciated that suitable variations are contemplated.

The device 300 includes a TX chain 132, a RX chain 130, a duplexer 114, one or more antennas 116 and a control circuit 128. Additional descriptions of these components are provided above with regards to FIG. 1.

The TX chain 132 generates a TX signal 334 at a TX frequency. The RX chain 130 receives a RX signal 332 at a RX frequency. The TX chain 132 and the RX chain 130 both use the one or more antenna 116 for TX and RX signals.

During the calibration process, the TX chain 132 is configured and tuned to use the TX frequency as the RX frequency. As a result, TX leakage 126 via the duplexer 114 substantially enters the RX chain 130 and is measured from the RX signal 332. The amount of TX leakage 126 present depends on a configuration of the TX chain, filtering or separating performance of the duplexer 114 and the like.

The performance of the duplexer 114, in some examples, exceeds duplexer design specifications. As a result, the TX leakage 126 is substantially less than a threshold or mask amount.

The RX chain 130 generates a signal or measurement 328 of the TX leakage. The control circuit 128 is configured to generate reduced performance parameters 330 based on the leakage measurement 328 and an allowed TX noise threshold or mask.

In one example, the control circuit 128 iteratively generates the reduced performance parameters 330 based on updated leakage measurements 328 until the leakage measurement 328 is within a selected amount of the threshold.

In another example, the control circuit 128 iteratively generates reduced performance parameters 330 until a selected power mitigation is obtained.

In yet another example, the control circuit 128 iteratively generates reduced performance parameters 330 until a selected power mitigation is obtained and the leakage measurement is within a selected amount of the threshold.

In another example, the control circuit 128 generates reduce performance parameters for a plurality of TX frequencies.

It is appreciated that suitable variations of the device 300 are contemplated. In addition, it is also appreciated that the device 300, 100 and/or the control circuit 128 can be used in communications devices to determine reduced parameters for transmission, such as the example device 400 described below.

Figure 4:
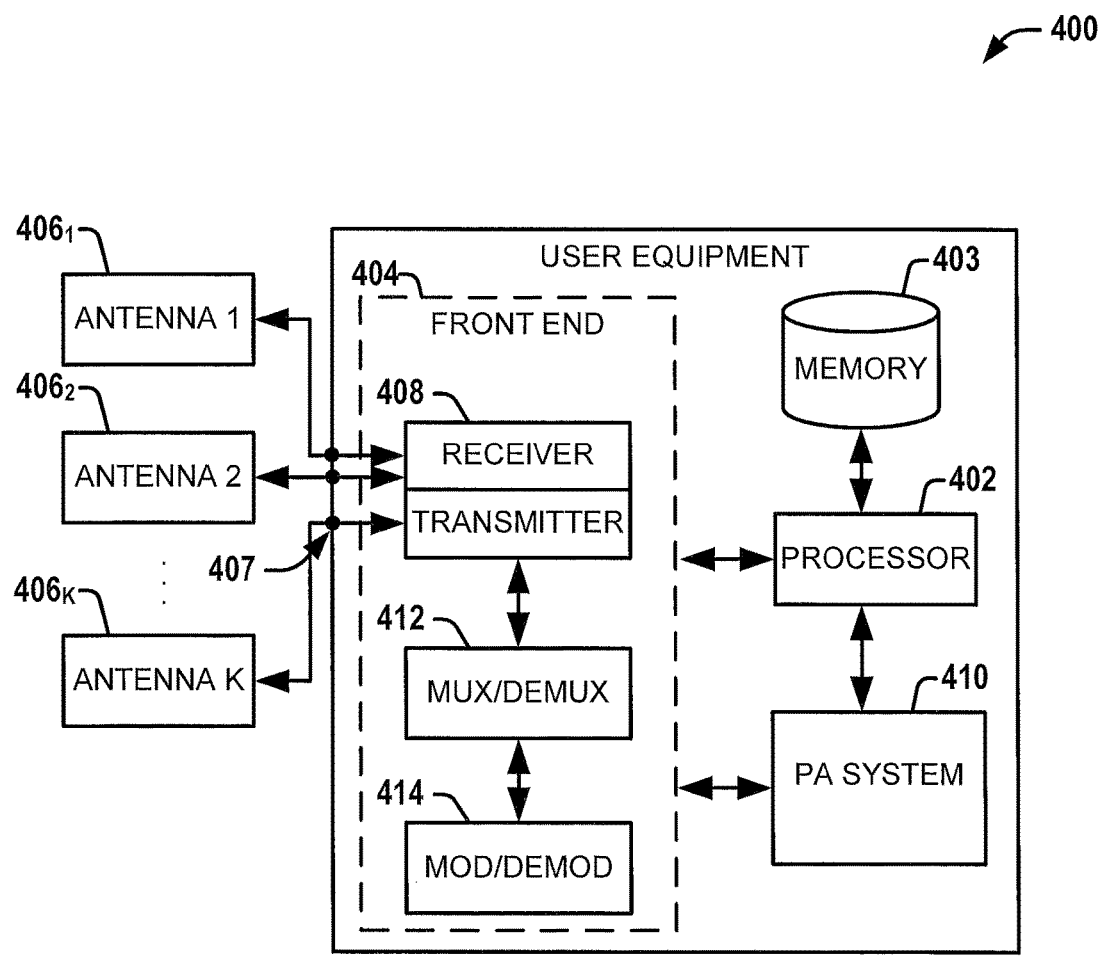
FIG. 4 is a diagram illustrating an exemplary user equipment or mobile communications device that can be utilized with one or more aspects.

FIG. 4 is a diagram illustrating an exemplary user equipment or mobile communications device 400 that can be utilized with one or more aspects of the transmitters (TX), TX chains, and/or variations thereof, as described above.

The mobile communications device 400, for example, comprises a digital baseband processor 402 that can be coupled to a data store or memory 403, a front end 404 (e.g., an RF front end, an acoustic front end, or the other like front end) and a plurality of antenna ports 407 for connecting to a plurality of antennas $406_1$ to $406_k$ (k being a positive integer). The antennas $406_1$ to $406_k$ can receive and transmit signals to and from one or more wireless devices such as access points, access terminals, wireless ports, routers and so forth, which can operate within a radio access network or other communication network generated via a network device. The user equipment 400 can be a radio frequency (RF) device for communicating RF signals, an acoustic device for communicating acoustic signals, or any other signal communications device, such as a computer, a personal digital assistant, a mobile phone or smart phone, a tablet PC, a modem, a notebook, a router, a switch, a repeater, a PC, network device, base station or a like device that can operate to communicate with a network or other device according to one or more different communication protocols or standards.

The front end 404 can include a communication platform, which comprises electronic components and associated circuitry that provide for processing, manipulation or shaping of the received or transmitted signals via one or more receivers or transmitters 408, a mux/demux component 412, and a mod/demod component 414. The one or more transmitters 408 can be configured use a DTC.

The front end 404, for example, is coupled to the digital baseband processor 402 and the set of antenna ports 407, in which the set of antennas $406_1$ to $406_k$ can be part of the front end.

The user equipment device 400 can also include a processor 402 or a controller that can operate to provide or control one or more components of the mobile device 400. For example, the processor 402 can confer functionality, at least in part, to substantially any electronic component within the mobile communications device 400, in accordance with aspects of the disclosure.

The processor 402 can operate to enable the mobile communications device 400 to process data (e.g., symbols, bits, or chips) for multiplexing/demultiplexing with the mux/demux component 412, or modulation/demodulation via the mod/demod component 414, such as implementing direct and inverse fast Fourier transforms, selection of modulation rates, selection of data packet formats, inter-packet times, etc. Memory 403 can store data structures (e.g., metadata), code structure(s) (e.g., modules, objects, classes, procedures, or the like) or instructions, network or device information such as policies and specifications, attachment protocols, code sequences for scrambling, spreading and pilot (e.g., reference signal(s)) transmission, frequency offsets, cell IDs, and other data for detecting and identifying various characteristics related to RF input signals, a power output or other signal components during power generation.

The processor 402 is functionally and/or communicatively coupled (e.g., through a memory bus) to memory 403 in order to store or retrieve information necessary to operate and confer functionality, at least in part, to communication platform or front end 404, the power amplifier (PA) system 410 and substantially any other operational aspects of the PA system 410.

Figure 5:
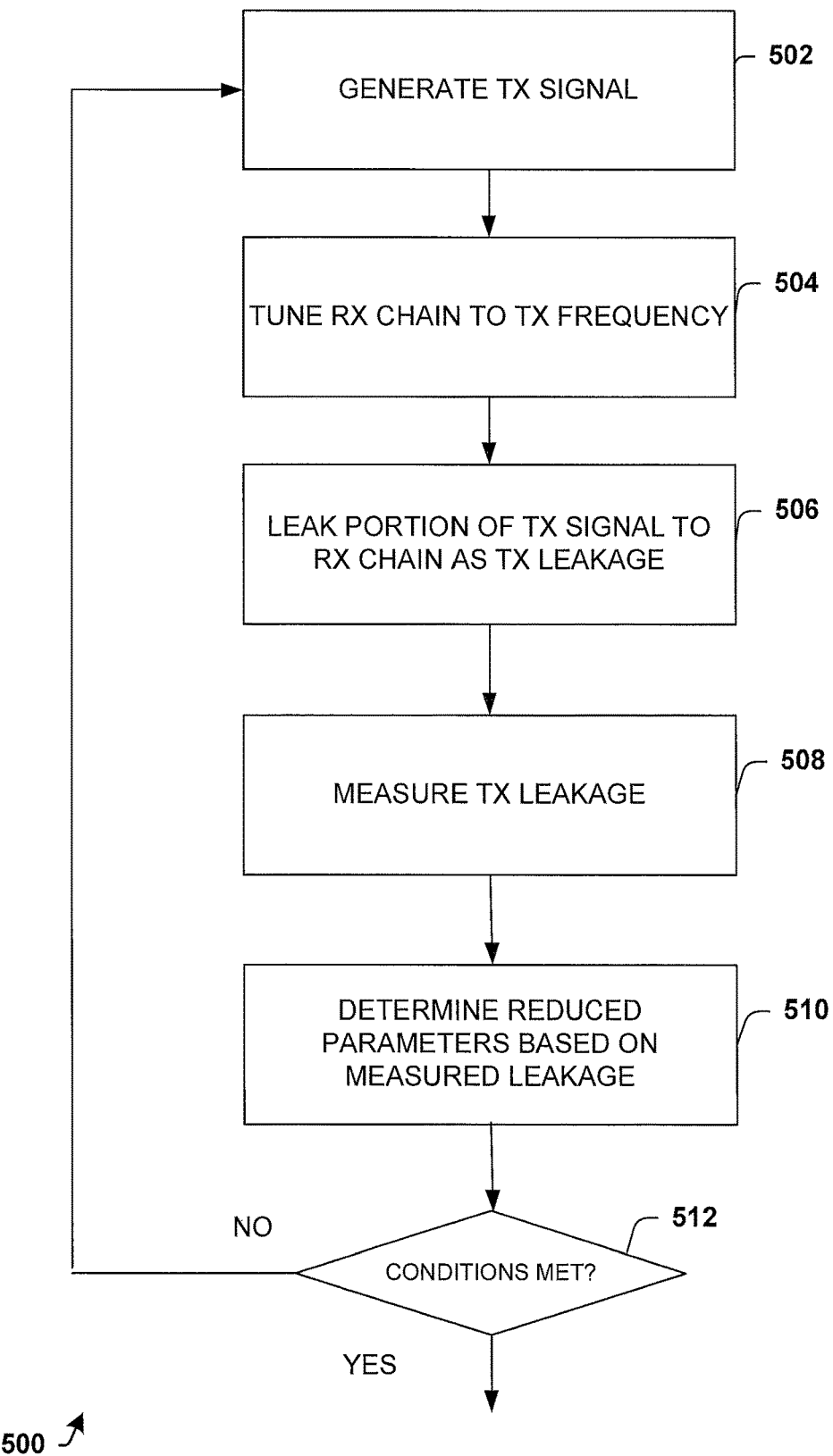
FIG. 5 is a flow diagram illustrating a method of calibrating a transmit (TX) chain based on leakage into a receiver (RX) chain.

FIG. 5 is a flow diagram illustrating a method 500 of calibrating a transmit (TX) chain based on leakage into a receiver (RX) chain. The method 500 can be used for communication purposes and/or other applications.

The above systems, devices, arrangements and the like can be referenced and used with or in conjunction with the method 500.

A TX chain generates a TX signal at a transmit frequency at block 502 using performance parameters. The transmit frequency can include a center frequency. The TX chain includes components such as a DPLL, CORDIC, PA, interpolator and the like. The TX chain components operate using performance parameters that include number of bits, resolution and the like. Examples of performance parameters are described above.

A RX chain is tuned to the transmit frequency at block 504. The RX chain can be tuned, for example, by using a tuner and a tuning signal. The tuning signal can be generated by a local oscillator.

A duplexer directs the transmission signal from the TX chain to an antenna and directs a TX leakage or TX leakage signal to the RX chain at block 506. The TX leakage signal can include leakage current and/or leakage voltage and is generally not wanted and leaks to the RX chain. The duplexer is configured and/or designed to mitigate the TX leakage signal according to selected specifications that can include an amount of allowed TX leakage.

The RX chain provides a measurement of TX leakage at block 508. In one example, a tuner converts a received signal that includes the TX leakage. The RX chain is tuned to the TX frequency, so the received signal is substantially composed of the TX leakage. The received signal is converted into a baseband signal. Filtering or other processing can further isolate the TX leakage and generate the measurement of the TX leakage.

A control circuit compares the measured TX leakage with a mask or threshold and determines reduced performance parameters for the TX chain at block 510 based on the comparison. Generally, the performance parameters are reduced by an amount based on the comparison. If the duplexer exceeds specifications, for example, then the TX leakage may be well below allowed values and larger reductions in the performance parameters can be obtained. If the TX leakage is at or above allowed values, the performance parameters are generally not reduced. In one example, the performance parameters are increased to reduce the TX leakage.

The method 500 can continues until suitable reduced performance parameters are obtained at block 512. In one example, the reduced performance parameters yield a TX leakage within a selected amount of the allowed threshold or mask. In another example, the reduced performance parameters provide at least a selected power mitigation for the TX chain.

If the reduced parameters are not suitable, the method goes to block 502 where the TX chain generates a second or another TX signal using the determined reduced performance parameters. The second TX signal is generated and passes through the duplexer. A second TX leakage can then be measured from the RX chain. The second TX leakage can be compared with the threshold or mask to determine if additional adjustments to the performance parameters are needed.

It is appreciated that the method 500 can be repeated, including repeating periodically, as needed and the like. Repeating the method 500 can provide further adjustments to the reduced performance parameters. In one example, the method 500 is repeated until the determined reduced performance parameters yield the second TX leakage that is within or less than the mask by a selected amount.

While the methods provided herein are illustrated and described as a series of acts or events, the present disclosure is not limited by the illustrated ordering of such acts or events. For example, some acts may occur in different orders and/or concurrently with other acts or events apart from those illustrated and/or described herein. In addition, not all illustrated acts are required and the waveform shapes are merely illustrative and other waveforms may vary significantly from those illustrated. Further, one or more of the acts depicted herein may be carried out in one or more separate acts or phases.

It is noted that the claimed subject matter may be implemented as a method, apparatus, or article of manufacture using standard programming and/or engineering techniques to produce software, firmware, hardware, or any combination thereof to control a computer to implement the disclosed subject matter (e.g., the systems shown above, are non-limiting examples of circuits that may be used to implement disclosed methods and/or variations thereof). The term "article of manufacture" as used herein is intended to encompass a computer program accessible from any computer-readable device, carrier, or media. Those skilled in the art will recognize many modifications may be made to this configuration without departing from the scope or spirit of the disclosed subject matter.

Examples may include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is an apparatus that includes a transmit chain, a duplexer, a receive chain and a control circuit. The transmit chain is configured to generate a transmit signal at a transmit frequency. The duplexer is configured to pass the transmit signal to an antenna and generate a transmit leakage current into a received signal. The receive chain is configured to obtain the received signal and measure the leakage current from the transmit chain. The control circuit is configured to determine reduced performance parameters for the transmit chain based on the determined leakage signal, where the transmit leakage signal is inversely proportional to the reduced performance parameters. The transmit leakage signal can be increased in response to the reduced performance parameters.

Example 2 includes the subject matter of example 1, including or omitting optional elements, where the transmit chain includes an interpolator and the reduce performance parameters include a reduced resolution for the interpolator.

Example 3 includes the subject matter of any of examples 1-2, including or omitting optional elements, where the transmit chain includes a radio frequency digital to analog converter (RFDAC) and the reduced performance parameters includes a reduced resolution for the RFDAC.

Example 4 includes the subject matter of any of examples 1-3, including or omitting optional elements, where the transmit chain includes a digital phase locked loop (DPLL) and the reduced performance parameters include a reduced resolution for the DPLL.

Example 5 includes the subject matter of any of examples 1-4, including or omitting optional elements, where the duplexer is configured to generate the transmit leakage below a selected amount.

Example 6 includes the subject matter of any of examples 1-5, including or omitting optional elements, where the receive chain includes a tuner configured to obtain the received signal at the transmit frequency, wherein the received signal substantially comprises the transmit leakage signal.

Example 7 includes the subject matter of any of examples 1-6, including or omitting optional elements, where the receive chain includes a low noise amplifier (LNA) configured to amplify the received signal.

Example 8 includes the subject matter of any of examples 1-7, including or omitting optional elements, where the duplexer is configured to pass an incoming signal from the antenna to the receive chain as at least part of the received signal.

Example 9 includes the subject matter of any of examples 1-8, including or omitting optional elements, where the control circuit is configured to iteratively determine the reduced parameters until a selected amount of power mitigation is obtained by the transmit chain.

Example 10 includes the subject matter of any of examples 1-9, including or omitting optional elements, where the control circuit is configured to iteratively determine the reduced parameters until the measured leakage signal is at or about a threshold value.

Example 11 includes the subject matter of any of examples 1-10, including or omitting optional elements, where the control circuit is configured to compare the measured leakage current with a noise mask and determine the reduced performance parameters based on the comparison.

Example 12 includes the subject matter of any of examples 1-11, including or omitting optional elements, where the transmit chain includes a radio frequency digital to analog converter (RFDAC) configured to generate the transmit signal using a digital phase locked loop signal at the transmit frequency.

Example 13 is a communications device that includes a transmit chain and a control circuit. The transmit chain includes a computer core, an interpolator, a radio frequency digital to analog converter (RFDAC) and a power amplifier. The computer core is configured to extract phase and magnitude information from a data stream. The interpolator is configured to generate an interpolator output signal from the extracted phase and magnitude information according to one or more performance parameters. The radio frequency digital to analog converter (RFDAC) is configured to generate an analog signal from the interpolator output signal based on a DPLL signal at a transmit frequency according to the one or more performance parameter. The digital phase locked loop (DPLL) is configured to generate the DPLL signal at the transmit frequency according to the one or more performance parameters. The control circuit is configured to adjust the one or more performance parameters from predetermined values to reduced performance values based on a measured transmit leakage signal at a receive chain.

Example 14 includes the subject matter of example 13, including or omitting optional elements, where the one or more performance parameters include an interpolator resolution for the interpolator.

Example 15 includes the subject matter of any of examples 13-14, including or omitting optional elements, where the one or more performance parameters include an RFDAC resolution for the RFDAC.

Example 16 includes the subject matter of any of examples 13-15, including or omitting optional elements, where the one or more performance parameters include a DPLL resolution for the DPLL.

Example 17 includes the subject matter of any of examples 13-16, including or omitting optional elements, where the control circuit is configured to compare the measured transmit leakage current with a noise mask and to determine the one or more performance parameters based on the comparison.

Example 18 is a method of calibrating a communications device. A transmit signal is generated at a transmit frequency using performance parameters. A receive chain is tuned to the transmit frequency. A portion of the transmit signal is leaked to the receive chain as transmit leakage. The transmit leakage is measured. Reduced performance parameters are determined based on the measured transmit leakage.

Example 19 includes the subject matter of any of examples 13-16, including or omitting optional elements, where the method further includes comparing the measured transmit leakage with a noise mask to determine the performance parameters.

Example 20 includes the subject matter of any of examples 18-19, including or omitting optional elements, where the determined performance parameters are used to generate a second transmission signal at the transmit frequency with reduced power consumption and an increased transmit leakage.

Example 21 is a communications device. The device includes a means for generating a transmit signal at a transmit frequency using performance parameters; a means for tuning a receive chain to the transmit frequency; a means for leaking a portion of the transmit signal to the receive chain as transmit leakage; a means for measuring the transmit leakage; and a means for determining reduced performance parameters based on the measured transmit leakage.

Although the invention has been illustrated and described with respect to one or more implementations, alterations and/or modifications may be made to the illustrated examples without departing from the spirit and scope of the appended claims. For example, although a transmission circuit/system described herein may have been illustrated as a transmitter circuit, one of ordinary skill in the art will appreciate that the invention provided herein may be applied to transceiver circuits as well.

Furthermore, in particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. The component or structure includes a processer executing instructions in order to perform at least portions of the various functions. In addition, while a particular feature of the invention may have been disclosed with respect to only one of several implementations, such feature may be combined with one or more other features of the other implementations as may be desired and advantageous for any given or particular application.

Furthermore, to the extent that the terms "including", "includes", "having", "has", "with", or variants thereof are used in either the detailed description and the claims, such terms are intended to be inclusive in a manner similar to the term "comprising".

What is claimed is:

1. An apparatus comprising:
   a transmit chain configured to generate a transmit signal;
   a duplexer configured to pass the transmit signal to an antenna and to generate a transmit leakage signal into a received signal;
   a receive chain configured to obtain the received signal and determine the leakage signal from the transmit chain; and
   a control circuit configured to determine reduced performance parameters for the transmit chain based on the determined leakage signal, wherein the transmit leakage signal is inversely proportional to the reduced performance parameters.

2. The apparatus of claim 1, wherein the transmit chain comprises an interpolator and the reduced performance parameters comprise a reduced resolution for the interpolator.

3. The apparatus of claim 1, wherein the transmit chain comprises a radio frequency digital to analog converter (RFDAC) and the reduced performance parameters comprise a reduced resolution for the RFDAC.

4. The apparatus of claim 1, wherein the transmit chain comprises a digital phase locked loop (DPLL) and the reduced performance parameters comprise a reduced resolution for the DPLL.

5. The apparatus of claim 1, wherein the duplexer is configured to generate the transmit leakage signal below a selected amount.

6. The apparatus of claim 1, wherein the receive chain comprises a tuner configured to receive the received signal at a transmit frequency of the transmit signal, wherein the received signal substantially comprises the transmit leakage signal.

7. The apparatus of claim 1, wherein the receive chain includes a low noise amplifier (LNA) configured to amplify the received signal.

8. The apparatus of claim 1, wherein the duplexer is configured to pass an incoming signal from the antenna to the receive chain as at least part of the received signal.

9. The apparatus of claim 1, wherein the control circuit is configured to iteratively determine the reduced parameters until a selected amount of power mitigation is obtained by the transmit chain.

10. The apparatus of claim 1, wherein the control circuit is configured to iteratively determine the reduced parameters until the measured leakage signal is at or about a threshold value.

11. The apparatus of claim 1, wherein the control circuit is configured to compare the measured leakage current with a noise mask and determine the reduced performance parameters based on the comparison.

12. The apparatus of claim 1, wherein the transmit chain includes a radio frequency digital to analog converter (RFDAC) configured to generate the transmit signal using a digital phase locked loop signal at the transmit frequency.

13. A method of calibrating a communications device, the method comprising:
   generating a first transmit signal at a transmit frequency using performance parameters;
   tuning a receive chain to the transmit frequency;
   leaking a portion of the first transmit signal to the receive chain as transmit leakage;
   measuring the transmit leakage in the receive chain; and determining one or more reduced performance parameters based on the measured transmit leakage, wherein the one or more reduced performance parameters reduce performance of a transmitter; and generating the first transmit signal using one or more initial performance parameters and generating a second transmit signal at the transmit frequency using the one or more reduced performance parameters, wherein the second transmit signal has a reduced power consumption and an increased transmit leakage as compared with the first transmit signal.

\* \* \* \* \*